United States Patent [19]

Lipscomb

[11] 3,856,465

[45] Dec. 24, 1974

[54] LEAK DETECTION COATING FOR AIRCRAFT FLEXIBLE FUEL CELLS

[75] Inventor: David J. Lipscomb, Smyrna, Ga.

[73] Assignee: Lockheed Aircraft Corporation, Los Angeles, Calif.

[22] Filed: May 17, 1973

[21] Appl. No.: 361,239

[52] U.S. Cl. ............... 23/230 L, 73/104, 117/2 R, 117/62.1, 117/162
[51] Int. Cl. ........................................... G01n 21/16
[58] Field of Search..... 23/230 L, 253 TP; 252/408; 73/104; 117/1, 162, 62.1, 2 R

[56] References Cited
UNITED STATES PATENTS

| | | | |
|---|---|---|---|
| 1,478,445 | 12/1933 | McClure | 23/230 L |
| 2,228,737 | 1/1941 | Tandberg et al. | 23/230 L |
| 2,918,893 | 12/1959 | Norton | 23/230 L |
| 3,317,283 | 5/1967 | King | 23/253 TP |

Primary Examiner—R. E. Serwin
Attorney, Agent, or Firm—Billy G. Corber; John J. Sullivan

[57] ABSTRACT

A fuel soluble coating facilitates the detection and location of leaks in aircraft flexible fuel cells. This coating contains an oil soluble dye and is applied like a paint to the exterior surfaces of flexible fuel cells by brush or spray. Fuel leaks extract sufficient color from the coating dye to identify the leaking cell without requiring cell removal from the aircraft. Coating dissolved by the escaping fuel also provides a visible and permanent track on the cell wall to the point of leak origin.

7 Claims, No Drawings

LEAK DETECTION COATING FOR AIRCRAFT FLEXIBLE FUEL CELLS

This invention relates to improvements in detecting leaks in fuel storage tanks and more particularly to a leak detection coating for internal aircraft flexible fuel tanks or cells and the method of using same to identify a particular cell which is leaking as well as the location of the leak or leaks in that cell.

In aircraft, flexible, elastomeric fuel cells are frequently utilized internally in the wings, nacelles, etc., often in multiple installations for fuel storage and containment. When a leak occurs in one such cell it is impossible to tell which one or ones are defective without defueling, purging and examining each cell as installed in the aircraft. If this inspection does not reveal the cause of fuel leakage all cells must be removed from the aircraft. This entails collapsing each cell and removing it, which is time-consuming, and, as far as the undamaged cells are concerned, unnecessary. The unnecessary removal and replacement of good fuel cells shortens the service life of such cells by subjecting them to needless handling damage and wear.

Existing leak detection devices offer no satisfactory solution to the problem. Generally speaking, the best of these existing devices, so far as the present invention is concerned, comprise an absorbent material like paper, cloth, webbing, or equivalent fabric impregnated with a colored dye soluble in the particular liquid or fuel adapted to be applied to the fuel container, as for example by adhesive or the like. Any fuel leakage from the area covered by treated material will pass through the material and dissolve dye therefrom imparting a stain of the color of the dye on the outer surface of the material which is readily visible. Such a device is illustrated and described in U.S. Pat. No. 3,317,283 issued May 2, 1967.

Unfortunately in aircraft with multiple fuel cell installations visibility of each cell is not possible without the removal therefrom from the aircraft. This is assuming that it was properly covered by the treated material which in itself might require special and time consuming effort.

The present invention proposes a leak detection coating and method of using it whereby the escaping fuel reacts with the coating so as to provide a distinctive colored solution from each cell exterior that becomes visible from outside the aircraft by observing fuel exiting the drain lines. In this way it is possible to identify the particular defective cell or cells since each cell has its own distinctive color.

In the event a particular cell is identified to be leaking by colored escaping fuel, such a cell after being defueled and purged may be examined in the aircraft. Previously leaking fuel after traversing the leak detection coating described herein will be dissolving the leak detection coating provide a visible and obvious trace on the exterior surfaces of the cell to the point or points of leak origin.

Moreover, the coating herein contemplated is applied directly to the outer surface of each cell in the fashion of a paint without the need of a fabric or carrier as employed in the prior art devices referred to above. This serves to substantially simplify the installation and assure a more reliable application of the leak detecting substance.

Essentially the leak indicating coating herein proposed comprises an oil soluble dye mixed with a rubber base cement. While the prior art does teach the detection of leaks by the application of an indicating paint to the exterior of a container or conduit, these earlier paints consist of mixing indicator powders with a resin base carrier material. U.S. Pat. No. 3,597,263 contemplates such a paint. As opposed to fuels these prior art paints are not oil soluble, being employed to detect water and steam leaks.

With the above and other objects in view as will be apparent, this invention consists of a fuel leak detecting coating especially suited for aircraft employing multiple, flexible fuel cells so formulated and applied in the sequence of procedural steps as hereinafter more specifically described and claimed.

More specifically, the present coating comprises the following ingredients:

1. Rubber cement which is soluble in aircraft grade hydrocarbon fuel, e.g., natural rubber dissolved in benzol solvent to produce a solution of about 6% solids. A suitable commercially-available product is No. 4 Cement manufactured and sold by the B. F. Goodrich Company, Akron, Ohio. The required quantity is approximately 2 quarts of rubber cement per gallon of coating desired;
2. Thinning solvent which is compatible with the rubber cement used. By compatible is meant that when mixed a homogeneous and smooth mixture results, i.e., the rubber cement will not coagulate. Such a solvent is hexane, technical grade. A suitable commercially-available product is Bestine Solvent manufactured and sold by Union Rubber and Asbestos Company, 232 East Allen Street, Trenton, New Jersey 08606. The required quantity is approximately 2 quarts of solvent per gallon of coating desired; and
3. Dye which is soluble in hydrocarbon fuel and stabile in air exposure, i.e., resistant to oxidation and ageing. Such an oil-soluble dye is the AZO or Anthraquinone type of selected color. The required quantity is approximately 1 to 1.2 ounces of dye per gallon of coating desired. A selected different color is used in each coating batch to be applied to adjacent cells within an aircraft. The preferred colors are red, blue and yellow. Suitable commercially- available products are Oil Blue V PG309, Oil Yellow PG318, and Oil Red A 1700 PG314, all manufactured and sold by American Cyanamide Company, Pigments Division, Wayne, New Jersey. The required quantity is approximately 30 grams of any of these above-noted dyes depending upon the color desired per gallon of coating.

While it is possible to combine the above ingredients in any order and stir them until thoroughly mixed it has been found that best results are obtained when each coating batch is formulated as follows:

1. Add about 30 grams of the desired colored dye to approximately 2 quarts of the hexane solvent. Stir until the dye is in solution;
2. Add approximately 2 quarts of the natural rubber cement to the above dye and solvent mixture and stir until a homogeneous mixture is obtained; and
3. Place the ultimate mixture in one or more air-tight containers until ready for use.

An application of each coating as herein contemplated would be as follows:

1. Initially the exterior of each rubber fuel cell to be installed in an aircraft is cleaned by solvent, wiping the surfaces using aliphatic naphtha. Alternate cleaning materials can be mild detergent and water. Allow the cleaned surfaces to dry.
2. A selected color of leak detection coating prepared in the above manner is then applied by brush to the cleaned exterior surfaces of each rubber fuel cell. Two cross coats are preferred, about 15 minutes air dry time being allowed between coats and about 2 hours air dry time being allowed after application of the final coat; and
3. Finally, the cell surfaces thus coated are then lightly dusted with talc to prevent the coating from adhering to itself when the cell is rolled up, as is usually required when installing into, and/or removing from, the aircraft.

When all of the cells are coated as hereinabove described they are installed in the aircraft with cells of different colored coating adjacent. Any leakage occurring from one of the cells after installation will be colored accordingly because the leaking fuel will dissolve the dye from the coating sufficiently to color the resulting fuel run-off and thereby identify the leaking cell. In addition, leaking fuel traversing the cell exterior will, by dissolving the coating and the dye, provide a visible trace or track to the point of leak origin on the cell exterior.

Therefore, the utilization of this leak detection coating on aircraft rubber cells does not require removal of the cells from the aircraft in order to ascertain the point of leak origin. This coating will greatly assist personnel in quickly and positively identifying leaks in installed aircraft rubber cells.

What is claimed is:

1. A leak detection coating for flexible fuel cells in aircraft comprising a batch of homogeneous mixture stored in an air-tight container until ready for use, said mixture consisting essentially of equal parts of a solvent and rubber cement and approximately 1 to 1.2 ounces per gallon of coating desired of an oil soluble dye selected from the AZO and Anthraquinone types.

2. The coating of claim 1 wherein said batch comprises approximately 30 grams of said dye and approximately 2 quarts each of said solvent and said rubber cement.

3. The coating of claim 1 wherein said mixture is produced by first mixing said dye in a solution with said solvent and then adding and mixing the rubber cement into said solution.

4. The coating of claim 1 wherein said solvent is technical grade hexane and said rubber cement is natural rubber dissolved in a benzol solvent to produce a solution of about 6 percent solids.

5. The coating of claim 1 including multiple said batches wherein a dye of selected different color is used in each batch.

6. The method of using the coating of claim 5 in an aircraft having multiple said cells comprising the steps of initially cleaning the exterior surface of each cell, applying a different batch of said coating to the entire area of the cleaned surfaces of each cell, allowing each said applied coating to dry, and finally dusting each coating when dried with talc.

7. The method of claim 6 wherein each said coating is applied by two cross coats, about 15 minutes air dry time being allowed between coats and about 2 hours air dry time being allowed after the final coat.

* * * * *